United States Patent [19]

Lederman

[11] Patent Number: 4,850,462
[45] Date of Patent: Jul. 25, 1989

[54] ROLLER CLUTCH SPRING WITH COMPACT AND STABLE LATCH

[75] Inventor: Frederick E. Lederman, Sandusky, Ohio

[73] Assignee: General Motors Corporation, Detroit, Mich.

[21] Appl. No.: 211,181

[22] Filed: Jun. 24, 1988

[51] Int. Cl.$^4$ .......................................... F16D 13/75
[52] U.S. Cl. ........................................ 192/45; 192/44
[58] Field of Search ................. 192/44, 45; 188/82.84

[56] References Cited

U.S. PATENT DOCUMENTS

| 3,055,472 | 9/1962 | Sauzedde | 192/45 |
|---|---|---|---|
| 3,732,956 | 5/1973 | Johnson et al. | 192/45 |
| 3,902,580 | 9/1975 | Johnson | 192/45 |
| 4,088,211 | 5/1978 | Doller et al. | 192/45 |
| 4,187,937 | 2/1980 | Kitchin | 192/45 |
| 4,415,072 | 11/1983 | Shoji et al. | 192/45 |
| 4,422,537 | 12/1983 | Ritter et al. | 192/45 |
| 4,549,638 | 10/1985 | Johnston | 192/45 |
| 4,555,002 | 11/1985 | Baker | 192/45 |
| 4,712,661 | 12/1987 | Lederman et al. | 192/45 |
| 4,782,928 | 11/1988 | Lederman | 192/45 |

*Primary Examiner*—Kenneth J. Dorner
*Assistant Examiner*—Brian K. Green
*Attorney, Agent, or Firm*—Patrick M. Griffin

[57] ABSTRACT

An improved latch for an accordion type roller clutch energizing spring includes a pair of resilient, flexible wings bent down from the bight of the mounting fold of the spring and a latching finger bent out from the tail of the spring, adjacent to the mounting fold. When the mounting fold is pressed over a vertical cross bar of the cage, the wings push up of the edge of the vertical cross bar, while the latching finger clicks beneath and pushes down off of the inner surface of the adjacent horizontal cross bar. This provides a triad of radially opposed and circumferentially and axially separated and balanced biasing forces to latch the spring securely in place with very good stability against twisting and rocking.

3 Claims, 3 Drawing Sheets

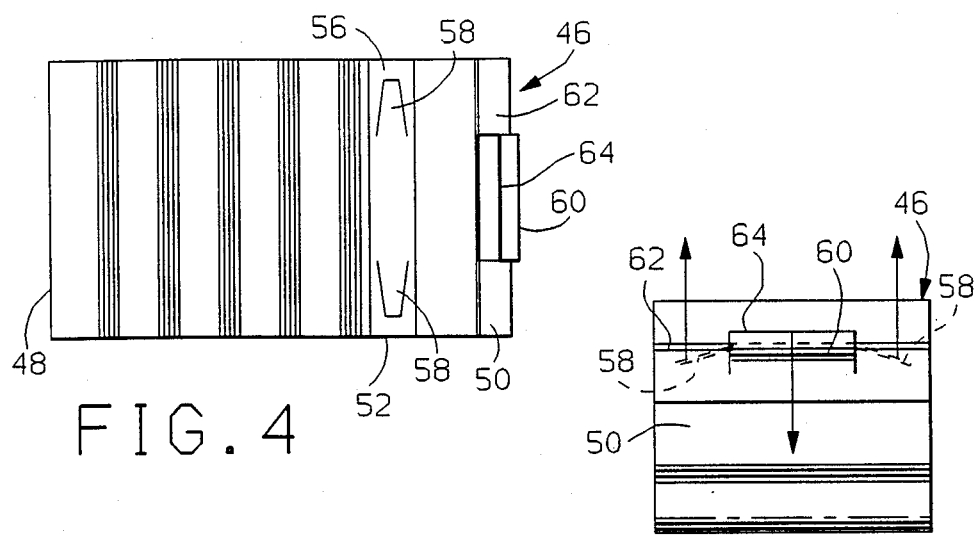
FIG. 4
FIG. 5
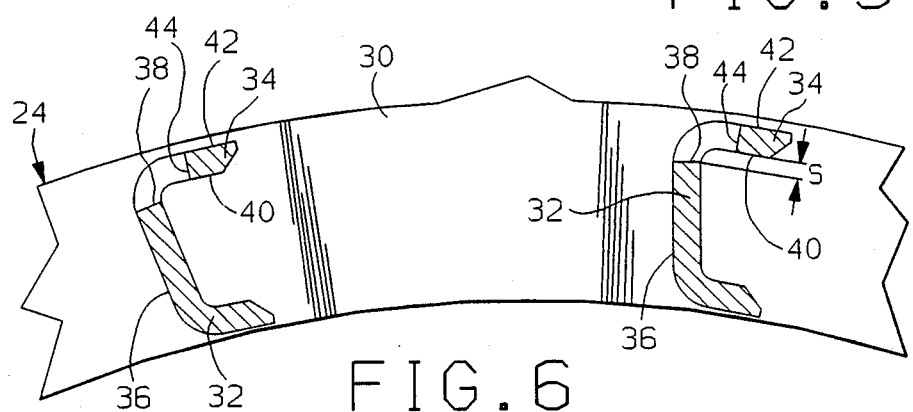
FIG. 6
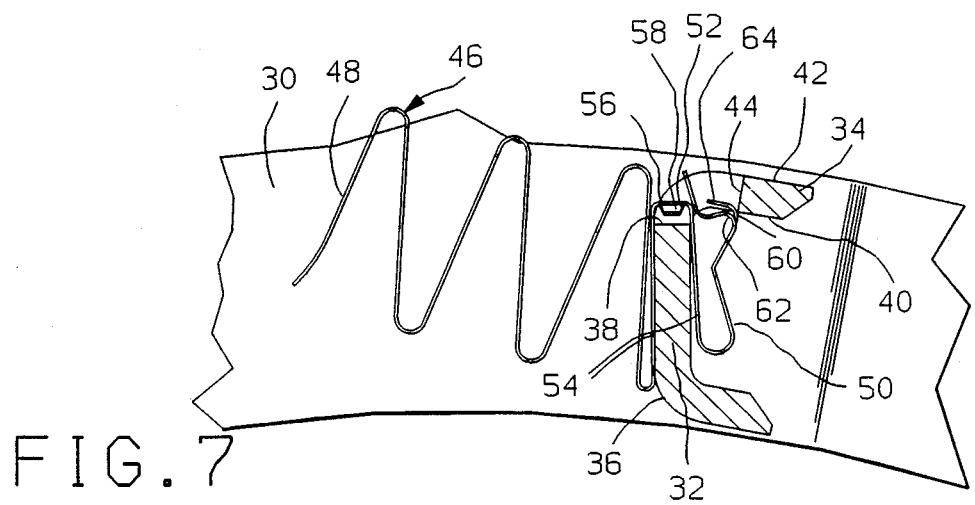
FIG. 7 und 4,850,462

ROLLER CLUTCH SPRING WITH COMPACT AND STABLE LATCH

This invention relates to roller clutches in general, and specifically to an energizing spring for a roller clutch cage that has a limited and restricted space available for mounting the spring to the cage

BACKGROUND OF THE INVENTION

Roller clutches include a cage and a plurality of energizing springs, one for each of a plurality of rollers, The springs may be retained just by the force of their own compression between a pocket and roller. More often, however, the springs are mechanically latched to the cage, so that they and the cage form a subassembly. There are several known means of latching the springs to the cage. A common type of cage has a series of vertical cross bars and adjacent cross bars, or equivalent structure, arranged in pairs so as to form radially opening slots. A commonly used energizing spring is the accordion type with a series of oppositely opening V shaped folds. When this type of cage and spring are used together, the spring is generally mounted by press fitting the next to last fold over the vertical cross bar, which simultaneously pushes the last fold into the slot. A latch structure of some type then clicks into place over or under a surface of one of the cross bars at the spring is pushed home to keep the next to last fold in place. An example of one possible latch structure is disclosed in U.S. Pat. No. 3,902,580 to Johnson, assigned to the assignee of the current invention. There, a spring finger bent out of a side of the mounting fold clicks under an edge of the vertical cross bar. Another possible approach is disclosed in U.S. Pat. No. 4,187,937 to Kitchin, also assigned to the assignee of the current invention. There, a short tab bent out of the tail of the last spring fold clicks under the horizontal cross bar as the next to last spring fold is predded onto the vertical cross bar.

While the last latch structure is rigid, it is somewhat difficult to assemble. During the spring attachment process, care must be taken to assure that the short latching tab ends up right under the inner surface of the horizontal cross bar, or very close to it, so that it can click solidly into place. The stroke with which the spring mounting fold is pushed into place must therefore be fairly closely controlled and monitored, and the tolerance "window" is not large. While this can be and has been done, tight tolerance assembly processes are inevitably more difficult and expensive. The latching structure disclosed in U.S. Pat. No. 4,782,928, also assigned to the assignee of the current invention, provides an improved latch for the same type of cage and spring that has a greater assembly tolerance window. A downwardly extending resilient flange and an upwardly extending resilient finger grasp the horizontal cross bar directly between them to provide a positive latch. The resilience of the flange and finger provide an increased zone of stability, and the attachment stroke need not be as closely monitored. The particular cage to which this spring is attached, however, happens to have sufficient room outside of the outer surface of the horizontal cross bar for the downwardly bent flange to work. That will not be the case for all cages of that general type. In some cages, the outer surface of the horizontal cross bar is so close to the periphery of the cage that there is no significant room available there for any latching structure to work.

SUMMARY OF THE INVENTION

The invention provides an accordion type spring with a different latching structure that has a comparable zone of stability, but which has a more compact latch that can be attached to a concentricity control cage. In the preferred embodiment disclosed, the latch can actually provide even greater stability to the spring.

The spring of the invention is part of an overrunning roller clutch with a cage of the type that has side rails joined by vertical cross bars and paired adjacent horizontal cross bars. Each vertical cross bar has two vertical surfaces joined by an edge, while each adjacent horizontal cross bar has two horizontal surfaces, and inner and an outer surface, also joined by an edge. The edge of each vertical cross bar is circumferentially spaced from the edge of each adjacent horizontal cross bar, and is also radially spaced from the inner surface of each horizontal cross bar. The outer surface of each horizontal cross bar lies close to the periphery of the cage. Since the cage is also used for concentricity control of the clutch races, there is no significant available between the outer surfaces of the horizontal cross bars and the outer clutch race after installation of the cage.

According to the preferred embodiment, the spring of the invention is the accordion type, with a roller contacting portion at the first fold and a spring tail at the last fold. A next to last mounting fold has a general U shape with two flat sides joined by a flat bight. The two sides of the mounting fold grip the surfaces of the vertical cross bar when the spring is mounted. The latch includes a pair of resilient wings bent down from the center of the mounting fold bight and extending out in opposite directions, and a resilient latching finger bent out from the spring tail. In the embodiment disclosed, the latching finger has a backwardly bent end, and is located axially between the ends of the resilient wings. The ends of the wings and the end of the latching finger are, in their free, pre attachment state, spaced from one another by less than the radial spacing between the edge of the vertical cross bar and the inner surface of the horizontal cross bar.

The mounting fold is pressed down until the ends of the wings hit the edge of the vertical cross bar and the wings compress, flexing toward the bight. The free state spacing between the ends of the wings and the latching finger described above assures that as the wings compress, the end of the latching finger will move beneath and be compressed against the horizontal cross bar inner surface. When the pressing force is released from the mounting fold, an equilibruim is reached as the two wings push off of the vertical cross bar edge in one radial direction, and the latching finger concurrently pushes off of the horizontal cross bar inner surface in the opposite radial direction. Both the wings and the latching finger remain under some compression from their free state, providing a positive, secure latch. The mounting fold's grip of the vertical cross bar is not adversely affected by the flexing of the wings toward and away from the bight, nor does the flexing of the backwardly bent end of latching finger toward and away from the spring tail adversely stress the spring tail. In addition, the available flex distances of both the backwardly bent end of the latching finger and the wings aids the stability of the latch by assuring that opposed radial biasing forces are fairly evenly balanced and shared. Furthermore, the stability of the latch is improved by the fact that the latching finger is axially between the ends of the wings, as well as being circumferentially spaced therefrom. A well balanced and separated triad of biasing forces is created to hold the spring in place solidly in place against twisting or rocking in any direction.

It is, therefore, a general object of the invention to provide an accordion type spring that can be easily mounted to a roller clutch cage with a secure and stable latch in those cases where there is limited space available outside the horizontal cross bar of the cage.

It is another object of the invention to provide such a spring latch in which a resilient wing bent down from the bight of a mounting fold of the spring and a latching finger bent out from the tail of the spring create radially opposed and circumferentially separated biasing forces as they engage a vertical and horizontal cross bar of the cage respectively.

It is still another object of the invention to provide such a spring latch in which a pair of wings extending down and out from the center of the mounting fold bight and a latching finger located axially between the wings provide a triad of well balanced and separated biasing forces to hold the spring with good stability.

It is yet another object of the invention to provide such a spring latch in which the flex distance of the resilient wings and of a backward bent end of the spring finger assure that the radially opposed biasing forces are evenly shared.

DESCRIPTION OF THE PREFERRED EMBODIMENT

These and other objects and features of the invention will appear from the following written description, and from the drawings, in which:

FIG. 1 is a view of a portion of the roller clutch, cage and spring of U.S. Pat. No. 4,782,928;

FIG. 4 is a plan view of the spring in its free state;

FIG. 5 is an end view of the spring in its free state.

FIG. 6 is a view of a portion of the cage prior to mounting the spring;

FIG. 7 is a view showing a spring in the process of being pushed into place;

Figure 1:
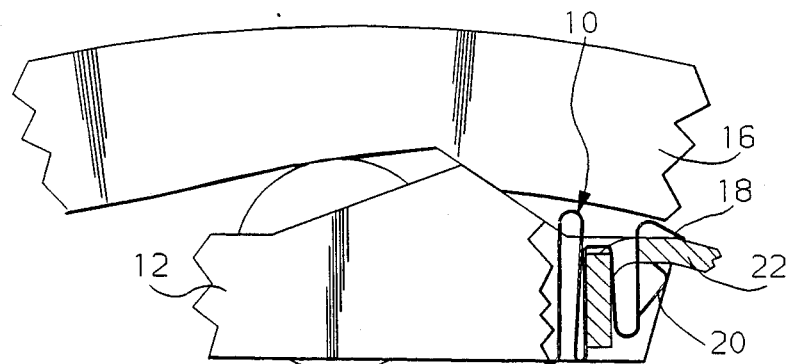

Referring first to FIG. 1, a spring 10 and portion of a cage 12 of the type disclosed in U.S. Ser. No. 918,575 referred to above are shown installed between a pair of clutch races 14 and 16. The novel features of the invention claimed in that case are not repeated in detail here. Briefle, a downwardly extending flexible flange 18 and an upwardly extending flexible latching finger 20 resiliently grasp a horizontal cage cross bar 22 between them so as to give an increased zone of stability to the spring latch. That is, there is a greater window during the process of pushing the spring 10 into place at which the latch will either click into place, or will pull itself into place, and after mounting, the spring can move up and down to a certain extent as the flange 18 and finger 20 flex back and forth, without jeopardizing the security of the latch. The current invention provides those same features, but is directed to additional different features not found in spring 10, which will be described in detail below. What is most relevant here is the fact that cage 12 is what is referred to as a free clearing cage, that is, it plays no part in keeping the clutch races 14 and 16 coaxial to one another. That function would be provided by some other bearing structure, not shown. Since cage 12 need not fit closely between the races 14 and 16, it can be manufactured quite simply, in this case, folded of sheet steel in a generally polygonal shape. Consequently, the outer surface of the horizontal cross bar 22 is not especially close to either the outer periphery of cage 12, or to the inner surface of outer race 16 after cage installation. There is plenty of space available above the outer surface of horizontal cross bar 22 for the flange 20 to work without hitting the outer race 16.

Figure 2:
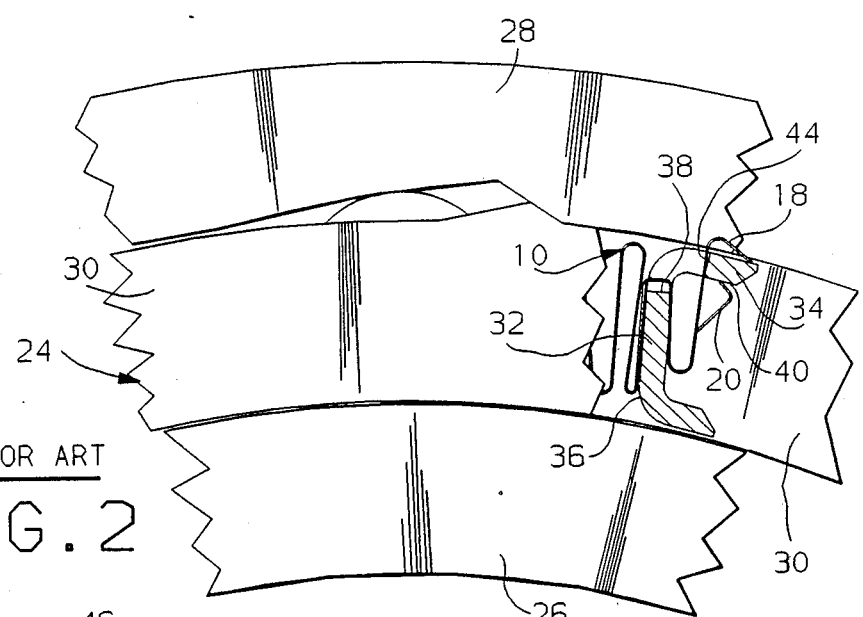
FIG. 2 is a view illustrating how the spring of FIG. 1 will not work with a concentricity control cage.

Referring next to FIGS. 2 and 6, the cage involved here is designated generally at 24. Cage 24 is what is referred to as a concentricity control cage, meaning that its own structure does provide the bearing that maintains the races 26 and 28 coaxial to one another. Specifically, cage 24 includes two spaced steel side rails 30 which are retained in rigid, parallel relation by evenly circumferentially spaced pairs of vertical cross bars 32 and adjacent horizontal cross bars 34. Each vertical cross bar 32 has a pair of generally vertical surfaces 36 joined by an edge 38, and each horizontal cross bar has inner and outer horizontal surfaces 40 and 42 joined by an edge 44. The cross bar edges 38 and 44 are circumferentially spaced from one another so as to form radially opening slots, and the vertical cross bar edge 38 has a predetermined radial spacing S from the horizontal cross bar inner surface 40. In actuality, the two cross bars 32 and 34 are part of a single C shaped cross bar which is cut through to form the two edges 38 and 44. It will be understood that equivalent vertical and horizontal surfaces and edges could be provided by some other cage structure, as well. However, it is simpler to conceptualize that part of the cage structure that lies between the side rails, whatever it may be, and whatever the orientation of the cage, as vertical and horizontal cross bars. As best seen in FIG. 2, when cage 24 is installed, it fits very closely between the races 24 and 26. The horizontal cross bar outer surfaces 42 lies very close to th e outer periphery of cage 24, and, consequently, very close to the outer race 28. Spring 10 cannot lie mounted to cage 12, since flange 18 is located outside the inner surface of outer race 28, making it unworkable.

Figure 3:
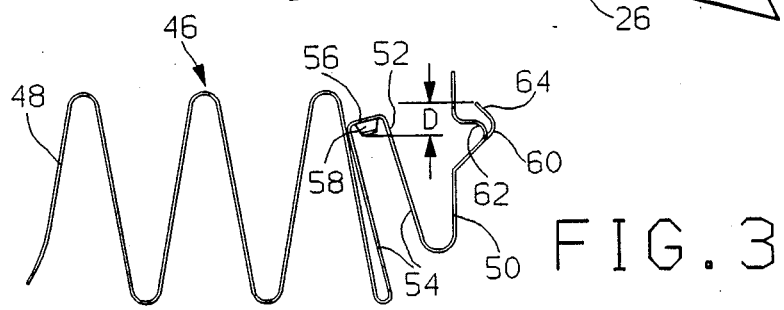
FIG. 3 is a side view of the spring of the invention in its free state.

Referring next to FIGS. 3, 4 and 5, the preferred embodiment of the spring of the invention, designated generally at 46, is the accordion type, with a plurality of oppositely opening folds. The front or head 48 of spring 46 is curved to form a roller contact, while the tail 50 includes other srtructure described below. Between the head 48 and tail 50 is a mounting fold, in this case, the next to last fold 52, which is comprised of two flat sides 54 joined by a flat bight 56, in a general U shape. The two mounting fold sides 54 are spaced apart suitably to grip the vertical cross bar surfaces 36. The latch includes a pair of wings 58 and a latching finger 60. The wings 58 are bent down and out to the side in opposite directions from the center portion of bight 56, for almost the full width of bight 56. Because the wings 58 are integrally formed from the spring material, they are resilient and flexible. Wings 58 do not go all the way to the edge of the bight 56, however, so as to not waken it, but do extend down far enough to engage vertical cross bar edge 38. Unlike a conventional, straight spring tail, spring tail 50 has a curve or corrugation 62 stamped near its center. Corrugation 62 serves to stiffen spring tail 50, and also provides a generally horizontal shelf of extra metal from which the latching finger 60 is stamped, bent generally upwardly and out, away from spring tail 50. Thus, the end of spring tail 50 is not invaded or interrupted when the latching finger 60 is formed, keeping it unwrinkled and structurally sound. Latching finger extends away from spring tail 50 far enough to end up under the horizontal cross bar inner surface 40 when spring 46 is attached, as will be described in detail below. Latching finger 60 is also not straight, but has a backwardly bent end 64 that extends back toward spring tail 50. Like the wings 58, finger 60 is also resilient and flexible. The latching finger end 64 and the ends of the wings 58 are, in their free, unflexed state, radially spaced from one another by a distance D that is less than S, for a reason described next.

Figure 8:
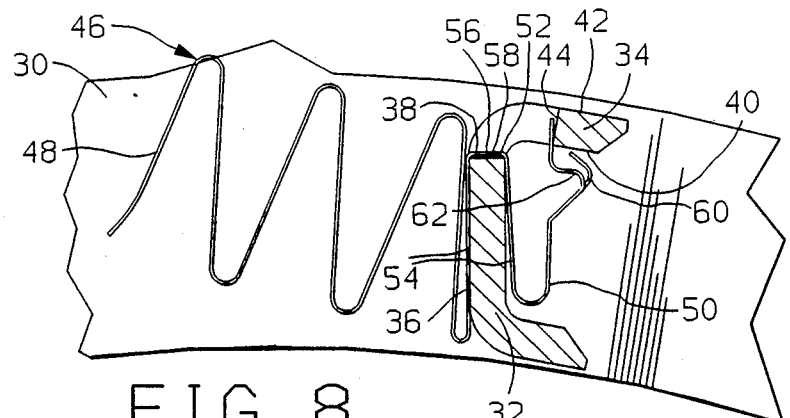
FIG. 8 shows the spring at the end of its mounting stroke, and the latching finger has clicked into place.

Referring next to FIGS. 7 and 8, mounting fold 52 is attached by pressing it over vertical crossbar 32. This would be done with a suitable apparatus that would apply downward pressure to bight 56 with a controlled stroke. Pushing down on bight 56 down drags the corruguated 62 along the horizontal cross bar edge 44, flexing spring tail 50 to the left, toward the bight 56, as well as flexing the latching finger 60 in, as best seen in FIG. 7. Bight 56 is pushed down until the wings 58 flatten against the vertical cross bar edge 38, as seen in FIG. 8, which would signal the end of the stroke. Concurrently, the peak of the corrugation 62 and the latching finger end 64 slip past the horizontal cross bar edge 44 and move beneath its inner surface 40 as spring tail 50 flexes back to the right. This gives a similar self seating action to that of the spring 10 referred to above as the energy in the flexed spring tail 50 and flexed finger 60 is released. The relation of S and D described above assures that the wings 58 will resiliently engage edge 38 and that the latching finger end 64 will resiliently engage surface 40, each being left in some compression. This securely and positively latches spring 46 to cage 24.

Figure 9:
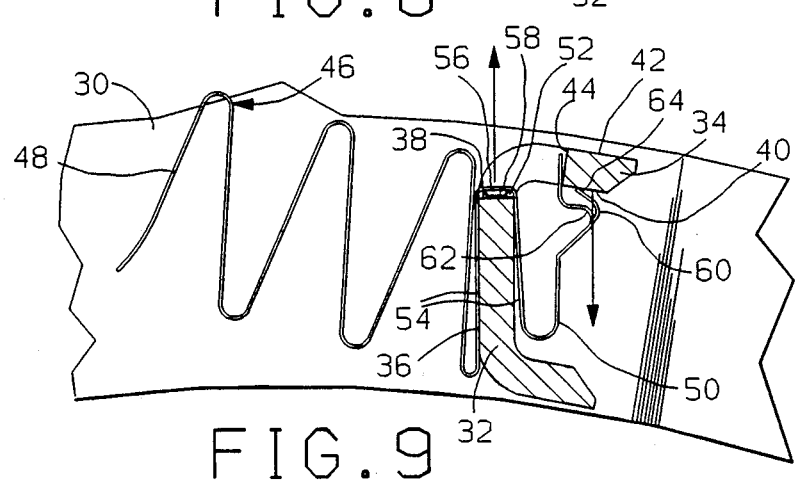
FIG. 9 shows the spring after the force of the mounting stroke has been released, and it has moved back up slightly to an equilibrium or balanced position.

Referring next to FIGS. 8 and 9, when the pressure is released from bight 56 at the end of the attachment stroke, wings 58 flex back up somewhat, pushing up off of edge 38. Simultaneously, latching finger 60 is flexed down to a somewhat greater degree, pushing in the opposite radial direction, down off of surface 40. An equilibruim between the radially oppositely acting biasing forces of wings 58 and finger 60 is reached, shown by the arrows. The length of the wings 58, and the backward bend 64 in the spring finger 60, are sufficient to assure that each has enough flex distance available so that the radially opposed biasing forces are fairly evenly distributed and shared between them. The fit of mounting fold 52 to vertical cross bar 32 is not affected by the flexing of the wings 58 toward and away from the bight 56, as the wings 58 act orthogonal to the gripping action of the mounting fold sides 54. Nor is spring tail 50 adversely stressed by the flexing up and down of latching finger 60. The flexing takes place primarily in the backwardly bent finger end 64, which moves up and down, moving finger 60 toward and away from the corrugation 62 from which it is formed, substsantially independently of spring tail 50. The mounting fold 52 can, in effect, bounce back and forth between the FIG. 8 and 9 positions, if some force were to disturb it to that degree, without affecting the integrity of the latch. In other words, the spring 46 has good radial stability. While the mounting fold of spring 10 referred to above has similar radial stability, the stability provided by the wings 58 and latching finger 60 differs in several important respects, as will be next described.

Figure 10:
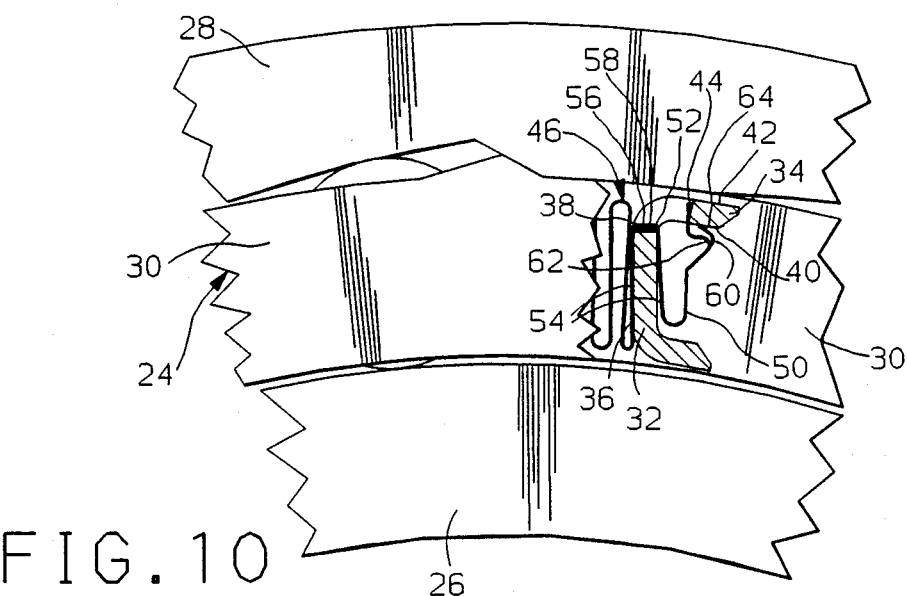
FIG. 10 shows the same portion of the cage and spring after a roller has been added and the clutch installed between a pair of clutch races.

Referring next to FIGS. 5, 9 and 10, it can be seen that the oppositely acting biasing forces provided by wings 58 and latching finger 60 have a significant circumferential separation, which is greater than the distance from edge 38 to edge 44. This may be compared to spring 10 described above, where the flange 18 and the finger 20 are essentially radially aligned, with little or no circumferential separation. Thus, the latch of the invention has the potential to hold spring 46 with very good circumferential stability against rocking, like holding a pole cantilevered out with the hands separated, rather than with the one hand on top of the other, Furthermore, as best seen in FIG. 5, the latching finger 60 is generally disposed in a plane that is centered axially between the ends of the wings 58, which extend axially out to the side as far as is practical. Thus, the opposed biasing forces of the wings 58 and the latching finger 60 have a significant axial separation, providing good axial stability to prevent the spring 46 from twisting or squirming. Stated differently, the wings 58 and latching finger 60 provided a triad of biasing forces, that is, forces with radial opposition and good circumferential and axial separation, and thus very good overall stability. Spring 46 will be well positioned to resist reaction forces thereon caused by roller travel during clutch operation. Just as important to the particular cage 24 involved, as best seen in FIG. 10, is that after installation, the limited space between the horizontal cross bar outer surface 42 and the outer clutch race 28 is essentially unobstructed. The wings 58 and latching finger 60 work entirely within the space already available. Only the very tip of spring tail 50 can move radially outwardly past the horizontal cross outer surfaces 42, and that only marginally. The added stability is achieved in a latch that is compact enough to work with a concentricity control cage.

Variations in the preferred embodiment disclosed may be made. A different number of resilient wings could be lanced out of the mounting fold 56, although the two wings 58 configured as they are give a stable base. The latching finger 60 could be straight rather than having the backwardly bent end 64, although that gives a good flex distance and a good distribution and sharing the radially opposed biasing forces relative to the wings 58. the corrugation 62 could be eliminated, so that the spring finger would be bent out from a completely straight spring tail 50. However, the corrugation 62 provides several real advantages, including added spring tail stiffness and also provides an excellent location for forming latching finger 60, which can then flex back and forth without significantly affecting the spring tail 50. The spring tail 50 could be comprised of one side of the mounting fold itself, if the mounting fold were nmadde the last, rather than the next to last fold. However, when the spring tail is part of a last fold opening oppositely to the mounting fold, as here, it is easier to form the latching finger 60, as it need not be as long in order to reach the horizontal cross bar inner surface 40. It is thus easier to provide a significant circumferential separation of the latching finger 60 from the wings 58. Therefore, it will be understood that the invention is not intended to be limited to just the preferred embodiment disclosed.

The embodiments of the invention in which an exclusive property or privilege is claimed are defined as follows:

1. In an overrrunning roller clutch with a cage that has a vertical cross bar with an edge and two vertical surfaces and an adjacent horizontal cross bar with an edge circumferentially and radially spaced from said vertical cross bar edge and an outer and an inner horizontal surface, said outer surface lying close to the periphery of said cage to create a limited space, an accordion type roller energizing spring that securely latches to said cage, comprising, a roller contact portion at a front end of said spring, a spring tail at a back end of said spring, a mounting fold between the front and back spring ends adapted to be attached by a press fit over said vertical cross bar and having two sides that grip the surfaces of said vertical cross bar and a bight connecting said two sides, a resilient wing bent down from said mounting fold bight far enough to engage said vertical cross bar edge when said mounting fold is attached, and a resilient latching finger bent out from said spring tail and extending toward said horizontal cross bar far enough to rest beneath said horizontal cross bar inner surface and spaced from said wing when said mounting fold is attached, with said spacing between said wing and finger, prior to said mounting fold being attached, being less than said predetermined radial spacing, whereby, after said mounting fold has been attached, said wing will be compressed against said vertical cross bar edge and said latching finger will be compressed against said horizontal cross bar inner surface, thereby securely latching said spring to said cage with the circumferentially spaced and radially opposed biasing forces of said wing and latching finger while leaving said limited space between said horizontal cross bar outer surface and the periphery of said cage unobstructed.

2. In an overrunning roller clutch with a cage that has a vertical cross bar with an edge and two vertical surfaces and an adjacent horizontal cross bar with an edge circumferentially and radially spaced from said vertical cross bar edge and an outer and an inner horizontal surface, said outer surface lying close to the periphery of said cage to create a limited space, an accordion type roller energizing spring thar securely latches to said cage, comprising, a roller contact portion at a front end of said spring, a spring tail at a back end of said spring, a mounting fold between the front and back spring ends adapted to be attached by a press fit over said vertical cross bar and having two sides that grip the vertical surfaces of said vertical cross bar and a bight connecting said two sides, a pair of resilient wings bent down from the center of said mounting fold bight and extending out and down far enough to engage said vertical cross bar edge at two axially spaced locations when said mounting fold is attached, and, a resilient latching finger bent out from said spring tail and extending toward said horizontal cross bar far enough to rest beneath said horizontal cross bar inner surface and spaced from said wings in a plane axially centered between said wings when said mounting fold is attached, with said spacing between said wings and finger, prior to said mounting fold being attached, being less than said predetermined radial spacing, whereby, after said mounting fold has been attached, said wings will push in one radial direction against said vertical cross bar edge and said latching finger will push in the opposite radial direction against said horizontal cross bar inner surface, thereby creating a traid of circumferentially and axially separated and radially opposed biasing forces to securely latch said spring to said cage while leaving said limited space between said horizontal cross bar outer surface and the periphery of said cage unobstructed.

3. In an overrunning roller clutch with a cage that has a vertical cross bar with an edge and two vertical surfaces and an adjacent horizontal cross bar with an edge circumferentially and rasially spaced from said vertical cross bar edge and an outer and an inner horizontal surface, said outer surface lying close to the periphery of said cage to create a limited space, an accordion type roller energizing spring that securely latches to said cage, comprising, a roller contact portion at a front end of said spring, a spring tail at a back end of said spring, a mounting fold between the front and back spring ends adapted to be attached by a press fit over said vertical cross bar and having two sides that grip the vertical surfaces of said vertical cross bar and a bight connecting said two sides, a resilient wing bent down from said mounting fold bight far enough to engage said vertical cross bar edge when said mounting fold is attached, and, a resilient latching finger bent out from said spring tail and extending away from said spring finger to a backwardly bent end far enough that said backwardly bent end rests beneath said horizontal cross bar inner surface and spaced from said wing after said mounting fold is attached, with said spacing between said wing and said latching finger backwardly bent end, prior to said mounting fold being attached, being less than said predetermined radial spacing, whereby, after said mounting fold has been attached, said wing will be compressed against said vertical cross bar edge and can flex toward and away therefrom substantially independently of the mounting fold's grip of said vertical cross bar and said latching finger backwardly bent end will be compressed against said horizontal cross bar inner surface and can flex toward and away therefrom substantially independently of said spring tail, thereby giving a secure and stable latch of said spring to said cage with the circumferentially spaced and radially opposed biasing forces of said wing and latching finger end substantially evenly distributed, while leaving said limited space between said horizontal cross bar outer surface and the periphery of said cage unobstructed.

* * * * *